US008285794B2

(12) United States Patent  
Parry

(10) Patent No.: US 8,285,794 B2  
(45) Date of Patent: Oct. 9, 2012

(54) SIGNATURE E-MAIL ATTACHMENT PRINTING

(75) Inventor: Travis J. Parry, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2063 days.

(21) Appl. No.: 10/144,906

(22) Filed: May 14, 2002

(65) Prior Publication Data

US 2003/0217107 A1 Nov. 20, 2003

(51) Int. Cl.
G06F 15/16 (2006.01)
(52) U.S. Cl. .................. 709/206; 715/170; 358/1.15
(58) Field of Classification Search .......... 709/206; 358/1.15
See application file for complete search history.

(56) References Cited

U.S. PATENT DOCUMENTS

| | | | |
|---|---|---|---|
| 5,316,279 A * | 5/1994 | Corona et al. | 270/1.01 |
| 5,530,755 A * | 6/1996 | Pailles et al. | 713/179 |
| 5,547,178 A * | 8/1996 | Costello | 270/52.02 |
| 5,819,032 A * | 10/1998 | de Vries et al. | 709/250 |
| 5,999,664 A * | 12/1999 | Mahoney et al. | 382/305 |
| 6,118,544 A * | 9/2000 | Rao | 358/1.18 |
| 6,267,517 B1 * | 7/2001 | Noda | 400/76 |
| 6,477,570 B1 * | 11/2002 | Takayama et al. | 709/224 |
| 6,535,295 B1 * | 3/2003 | Brossman et al. | 358/1.15 |
| 6,563,598 B1 * | 5/2003 | Johnson et al. | 358/1.15 |
| 6,571,334 B1 * | 5/2003 | Feldbau et al. | 713/170 |
| 6,604,132 B1 * | 8/2003 | Hitt | 709/206 |
| 6,614,551 B1 * | 9/2003 | Peek | 358/1.15 |
| 6,701,347 B1 * | 3/2004 | Ogilvie | 709/206 |
| 6,898,625 B2 * | 5/2005 | Henry et al. | 709/206 |
| 6,924,904 B2 * | 8/2005 | Stevens et al. | 358/1.18 |
| 6,952,281 B1 * | 10/2005 | Irons et al. | 358/1.15 |
| 6,956,664 B1 * | 10/2005 | Kutty | 358/1.15 |
| 7,162,635 B2 * | 1/2007 | Bisbee et al. | 713/176 |
| 7,321,437 B2 * | 1/2008 | Parry | 358/1.15 |
| 7,490,240 B2 * | 2/2009 | Scheidt et al. | 713/176 |
| 7,573,598 B2 * | 8/2009 | Cragun et al. | 358/1.18 |
| 7,607,018 B2 * | 10/2009 | Baxter et al. | 713/176 |
| 2001/0029513 A1 * | 10/2001 | Kuwano et al. | 707/522 |
| 2002/0042879 A1 * | 4/2002 | Gould et al. | 713/176 |
| 2002/0048044 A1 * | 4/2002 | Kida | 358/1.15 |
| 2002/0178190 A1 * | 11/2002 | Pope et al. | 707/530 |
| 2002/0186384 A1 * | 12/2002 | Winston et al. | 358/1.5 |
| 2002/0188689 A1 * | 12/2002 | Michael | 709/206 |
| 2003/0105716 A1 * | 6/2003 | Sutton et al. | 705/50 |
| 2003/0182378 A1 * | 9/2003 | Treptow et al. | 709/206 |
| 2004/0218226 A1 * | 11/2004 | Antognini et al. | 358/402 |
| 2005/0024682 A1 * | 2/2005 | Hull et al. | 358/1.18 |

* cited by examiner

Primary Examiner — Greg C Bengzon

(57) ABSTRACT

A method and system for organizing printed documents associated with an e-mail message wherein each of the printed documents may be separated by a printer header page reflecting some or all of the signature information included with the e-mail message from which the printed documents originate.

15 Claims, 2 Drawing Sheets

SIGNATURE E-MAIL ATTACHMENT PRINTING

FIELD OF THE INVENTION

The present invention relates to a system and method for improving the separation of printed documents. More particularly, the present invention relates to an improved method and system for organizing the printing of e-mail messages and attachments associated with such e-mail messages.

BACKGROUND OF THE INVENTION

The use of computers within our society is becoming commonplace. Businesses frequently use computers to perform many tasks, including data storage, calculations, document creation, communications and the like. Similarly, more and more personal computer users rely extensively on computers to keep track of financial records, to manage personal documents, to surf the Internet and to accomplish communications, such as e-mail communications.

Sending, receiving, and composing e-mail has become one of the primary uses for computers today. Over the past decade, use of e-mail for business, academic, and personal communications has skyrocketed. Many computer users have one or more e-mail addresses for receiving e-mail for business, or for personal reasons.

The use of e-mail for sending information generally involves the steps of addressing an e-mail to one or more intended recipients, composing the body of the email, and possibly adding one or more attachments to the e-mail. An addressed e-mail may then be sent to the intended recipient. Upon receipt of an e-mail, a user may view the e-mail on a display device or print the e-mail to a connected printer for hardcopy reading. Other functions, such as e-mail forwarding, responding, or saving the e-mail may also be included as features found with a program for handling e-mail communications.

A received e-mail typically consists of two or more parts that may be distinctly separated: a body and a signature. The body of the e-mail might consist of a message or other information that the e-mail composer wishes to convey to an e-mail recipient. The signature of the e-mail may consists of information describing the origin of the e-mail, the time the e-mail was sent, or other information that identifies the e-mail as a unique e-mail. An e-mail may also consist of additional components such as attachments, or files, that an e-mail composer wishes to communicate to the e-mail recipients.

Typically, an e-mail signature is included with an e-mail as a separate file, or an attached file. However, an e-mail signature may be included with the body of an e-mail in a Multipurpose Internet Mail Extension file, or MIME file, which is read by an e-mail program being used to view the e-mail. Reading the MIME file, the e-mail program strips the body of the e-mail and displays it on a visual monitor for a user to read. The signature may be ignored by the program.

In other instances, a customized signature may be included with an email message. Many e-mail composition programs allow users to create or define a signature to be attached to any e-mails sent by the user of the e-mail program. A user may choose to automatically include the customized signature with each e-mail, or to only include the signature on certain e-mails when the user selects to include the customized signature. Customized signatures created in such a manner are typically displayed at the end of the body of the email.

Frequently, users print e-mails to a printer or copier to create a hardcopy of the e-mail for archival purposes or for reading at a later date. Often times, the formatting of a printed e-mail depends upon the e-mail program being used to receive and print the e-mail. However, most e-mail programs print the e-mail address of the sender and the recipient, along with the date of the e-mail and the subject line of the email, before printing the body of the e-mail. If a customized signature is included with the e-mail, the customized signature is typically printed following the e-mail body.

E-mail printed using the typical printing techniques may be identified by the recipient and sender addresses printed along with the body of the e-mail. Alternatively, a printed e-mail may be identified by a customized signature printed at the end of the e-mail body. This, however, requires that a user flip to the last page of a printed e-mail in order to identify who the printed e-mail belongs to.

In some instances, it may be desirable to separately identify an e-mail during printing. It may also be desirable to identify any attachments printed along with an e-mail as originating from that e-mail. Thus, an improved system and method for printing emails and attachments is desirable.

SUMMARY OF THE INVENTION

In one embodiment of the present invention, signature information associated with an e-mail and/or e-mail attachments may be printed with a header page prior to printing the body of the e-mail or attachments on subsequent pages. The signature information may be stripped from the e-mail. Once stripped, the signature information is printed on a header page before the e-mail is printed. The header page thus describes the origin of the printed e-mail, the recipients of the printed e-mail and date and time that the e-mail was sent to those recipients. A header page such as this may be used to improve document separation capabilities at printing devices, especially in enterprise situations.

In another embodiment of the present invention a user may choose to print a single header page for a printed e-mail message and accompanying attachments or to print separate header pages for the e-mail body and each of the additional attachments. At times, it may be desirable to separate one printed attachment from other printed attachments. The present invention allows the attachments to be separated by header pages which are still capable of identifying the origin of the attachments because each header page includes the signature information from the e-mail to which the attachments were associated.

In yet another embodiment of the present invention, a printer daemon may be used to strip signature information from an e-mail for preparing and printing a header page prior to printing the e-mail.

In another embodiment of the present invention, signature information may be stripped from an e-mail message to create a unique path and file name for saving the e-mail message and any attachments to a file in a memory of a computer, to a storage device, or to a job retention memory of a printer.

The term "daemon" as used herein means and includes processes or programming operating behind or with the operating system of a computing device for performing tasks for the operating system as known in the art. Although various operating systems use different names or terms for daemon processes and programming, the term daemon as used herein includes such processes and programming.

DESCRIPTION OF THE DRAWINGS

While the specification concludes with claims particularly pointing out and distinctly claiming that which is regarded as the present invention, the present invention can be more readily ascertained from the following description of the invention when read in conjunction with the accompanying drawings in which:

DETAILED DESCRIPTION OF THE INVENTION

Figure 1:
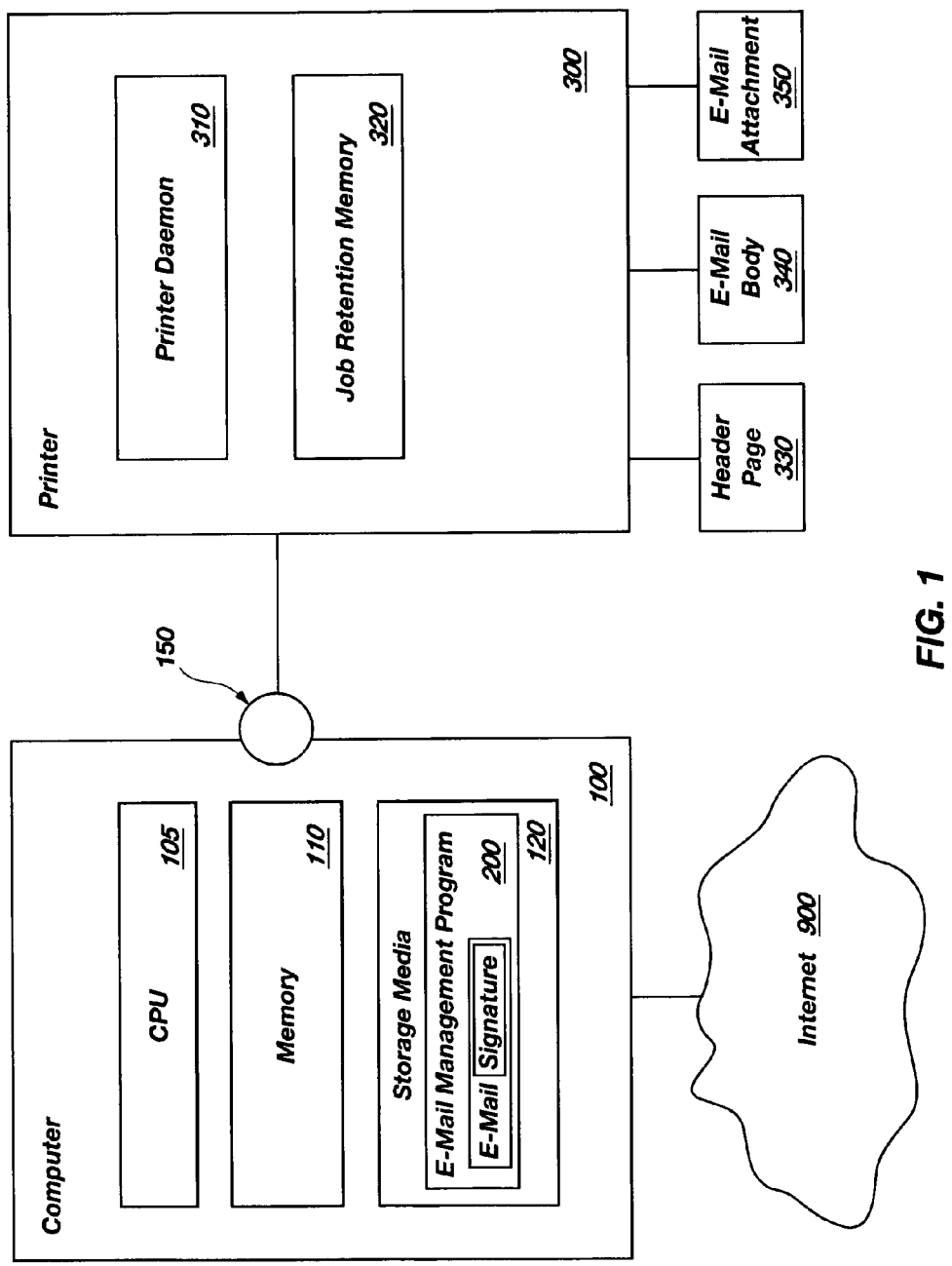
FIG. 1 illustrates a system for carrying out the various embodiments of the present invention.

A system for carrying out the various embodiments of the present invention is illustrated in FIG. 1. A computer 100, including one or more central processing units 105 (CPU) and a memory 110, may host an e-mail management program 200 for sending, receiving, printing, storing, and otherwise manipulating e-mail messages and attachments. The e-mail management program 200 may reside in the memory 110 of computer 100 or in a storage media 120 accessible to the computer 200. A printer 300, or other printing device, may be connected to, or in communication with, a communication port 150 of computer 100. Typically, communications between computer 100 and printer 300 may be accomplished using known communication techniques such as hardwire communications, infrared communications, radio communications, or otherwise. Printer 300 may also be a printing device connected to a network computer system wherein computer 100 is one of a plurality of computers or workstations connected to the network computer system.

Computer 100 may be any type of computer capable of receiving email, including a computer connected to a network computer system. Preferably, computer 100 may be connected to the Internet 900 for sending or receiving e-mail messages via the Internet 900 to and from locations remote from computer 100.

An e-mail management program 200 used with the present invention may be one of many commercially available e-mail management programs or a customized e-mail management program including programming for carrying out the various embodiments of the present invention. In any event, an e-mail management program for use with the present invention may include the capability to receive and print e-mail messages.

In one embodiment of the present invention, the signature information of an e-mail (as shown in FIG. 1) may be stripped from an e-mail and printed as a header page to identify an e-mail being printed. Once stripped from an e-mail, the signature information may be printed as the first page in a document consisting of the e-mail message. The body of the e-mail may be printed on consecutive pages without the signature information. Thus, the signature information printed on the header page may be used to identify an e-mail print job. At the same time, the body of the e-mail may be printed without any identifying indicia such that distribution of the printed e-mail does not disclose either the sender or recipients of the e-mail. Methods of stripping signature information from an e-mail are known in the art.

More particularly, a computer 100 may receive an e-mail message for an e-mail address associated with the computer from an Internet 900 connection. Using an e-mail management program 200, the e-mail may be viewed by a user of computer 100. Furthermore, the user may choose to print the body of the e-mail message without the inclusion of any signature information. Using an e-mail management program configured to allow printing according to the various embodiments of the present invention, a user could choose to send the e-mail message to printer 300. Before being sent to the printer 300, the e-mail management program may separate, or strip the signature information from the e-mail message. The signature information may be passed to the printer 300 as header page information for printing as a Header Page 330 for the E-Mail Body 340 message which is printed on consecutive pages by printer 300.

In an alternate embodiment of the present invention, printer 300 is configured with a printer daemon 310, or other program, for stripping signature information from an e-mail and printing such information as a header page before printing the body of the e-mail. In such instances, the e-mail management program need not include coding or programming for stripping the signature information from e-mails before printing the e-mails. In operation, the printer daemon 310 screens all print jobs sent to printer 300. If the print job is identifiable as an e-mail having signature information, the signature information is stripped by the printer daemon 310 and printed as a header page before the remainder of the e-mail document is printed by printer 300. Thus, the signature information may be used to identify a print job and the body of the e-mail may be printed without any signature information.

In another embodiment of the present invention customized signature information may also be stripped from an e-mail and printed with the header page. In addition to the signature information typically included as part of the MIME file of an e-mail, customized signature information may be attached to the end of an e-mail. The customized signature information may include a customized message from the sender of the e-mail or information about the sender which identifies the sender's e-mail address or other information. In some instances, it may be desirable to eliminate such information from a printed copy of an e-mail. However, the information included in the customized signature information may include important information, such as a confidentiality statement or other statement, that an e-mail recipient may wish to print. In such cases, an e-mail management program for manipulating and sending the e-mail to printer 300, or a printer daemon 310, may be configured according to the present invention to strip any customized signature information from an e-mail message and print that information on a header page of the printed e-mail. Methods for stripping customized signatures from an e-mail are known in the art.

In some instances, e-mails also contain attachments that a user may wish to print along with, or separate from, the body of the e-mail message. The various embodiments of the present invention may be used to create and print a Header Page 330 for any E-Mail Attachments 350 that are printed. For instance, an e-mail message opened by an e-mail management program 200 residing in a memory 110 of computer 100 may be invoked to print both the E-Mail Body 340 message and the E-Mail Attachments 350 of the same e-mail message. If the user desires a header page to identify the printing of the e-mail body and the attachments, the e-mail management program 200 may be instructed to strip the signature information from the e-mail message and print the same as a Header Page 330 prior to printing the E-mail Body 340 and the E-Mail Attachment 350. Thus, the Header Page 330 consisting of the printed signature information identifies the print job.

Figure 2:
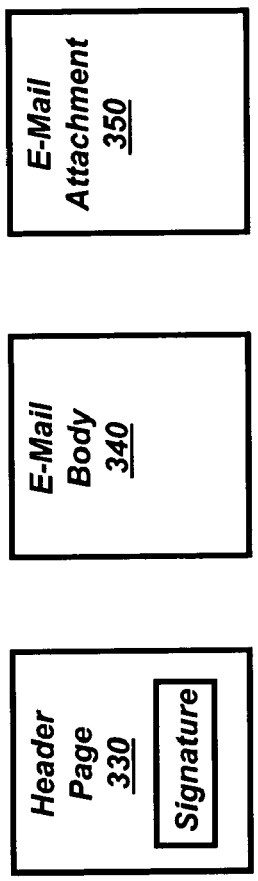
FIG. 2 illustrates one embodiment of printing a header page according to the present invention.
Figure 3:
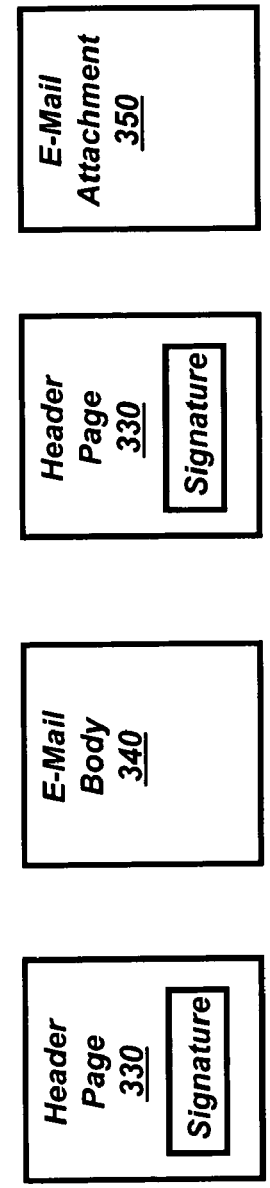
FIG. 3 illustrates another embodiment of printing a header page according to the present invention.

As illustrated in the embodiments of FIGS. 2 and 3, a header page 330 may be used to identify both the e-mail body 340 and the e-mail attachments 350. In one embodiment, as illustrated in FIG. 2, a user may choose to have a single header page 330 with the signature information printed along with the e-mail body 340 and any attachments 350. In another embodiment, as illustrated in FIG. 3, a user may choose to print a header page 330 with the signature information before the body 340 of the e-mail is printed and before the printing of each and every attachment 350. Thus, each document printed would include a header page with the signature information from the e-mail from which the print job originated.

Signature information may also be used to uniquely store e-mails and attachments to emails. In another embodiment of the present invention, the signature information may be stripped from an e-mail prior to saving the e-mail message and any attachments thereto. Once removed, or stripped, from the e-mail, the signature information for the e-mail may be used to create a file name and/or a path to which the e-mail message and attachments may be saved. For instance, a date included in the signature information identifying the date that an e-mail was sent may be used to create a directory, or path, to which the e-mail may be saved. Different directories may be created in the memory 110 of computer 100 or on storage media 120 of computer 100. E-mail messages and attachments corresponding to each particular date may be saved in the particular directory using a unique file name. The file names may be created from the name or e-mail address of the recipient as included in the signature information. Alternatively, a file name may be created from other information included in the signature information. Thus, a saved e-mail file may be named according to the recipient's name or e-mail address rather than the subject line information or the sender's name.

In another embodiment of the present invention, an e-mail and any attachments may be stored in a memory of a printer 300, such as in a job retention memory 320 of the printer. The signature information may be used to create the path and filename for the stored e-mail and attachments as previously described. In addition, a printer daemon 310, or a program associated with the job retention memory 320 of printer 300, may strip the signature information from an e-mail message and print a header page at the time the e-mail message and any attachments are stored in the job retention memory 320. The printed header page may include the signature information of the e-mail message along with the path and filenames of the e-mail message and any attachments as stored in the job retention memory 320 of the printer 300.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. A method of printing an e-mail message, comprising:
sending said e-mail message to a printing device for printing, said e-mail message comprising a body and a signature, said signature included within said e-mail message at an end of said body of said e-mail message;
separating said body and said signature, including receiving said e-mail message by said printing device, routing said e-mail message to a daemon operating on said printing device, and executing said daemon on said printing device for stripping said signature from said e-mail message at said printing device;
separately printing said signature as a header page before printing said body; and
after separately printing said signature as said header page, separately printing said body.

2. The method of claim 1, wherein said separating said body and said signature comprises receiving said e-mail message at an e-mail management program, and operating said e-mail management program to strip said signature from said e-mail message.

3. The method of claim 1, wherein said e-mail message further comprises at least one attachment, and further comprising printing said at least one attachment to said e-mail message.

4. The method of claim 3, wherein said separately printing said signature as a header page comprises separately printing said signature as a single header page before printing said body of said e-mail message and said at least one attachment to said e-mail message.

5. The method of claim 3, wherein said separately printing said signature as a header page comprises:
separately printing said signature as one header page before printing said body of said e-mail message; and
separately printing said signature as another header page before printing said at least one attachment to said e-mail message.

6. The method of claim 1, wherein said signature comprises a customized signature included within said e-mail message, wherein said separating said body and said signature comprises stripping said customized signature from said e-mail message.

7. The method of claim 1, further comprising:
creating a file name for storage of said e-mail message from said signature of said e-mail message;
storing said e-mail message to a storage location with said file name; and
printing said signature and said file name as a header page when said e-mail message is stored in said storage location.

8. A system for printing e-mail messages, comprising:
a computer system;
an e-mail management program operating with said computer system;
a printer in communication with said computer system; and
a printer daemon operating with said printer for separating signature information included at an end of a body of an e-mail sent to said printer from said body of said e-mail, separately printing said signature information as a header page before printing said body of said e-mail, and, after separately printing said signature information as said header page, separately printing said body of said e-mail,
wherein a file name for said e-mail is created from said signature information of said e-mail, and said e-mail is stored with said file name.

9. The system of claim 8, said printer daemon further operating with said printer for printing said signature information as a header page before printing said body of said e-mail and for printing said signature information as another header page before printing an attachment to said e-mail.

10. A method of printing an e-mail message, comprising:
sending said e-mail message to a printing device for printing, said e-mail message comprising a body, signature information, and at least one attachment, said signature information included at an end of said body of said e-mail message;
stripping said signature information from said e-mail message, including routing said e-mail message to a daemon operating on said printing device, and executing said daemon on said printing device for stripping said signature information from said e-mail message at said printing device;
printing said signature information as a header page before printing said body of said e-mail message and printing said body of said e-mail message after printing said header page, including eliminating said signature information from a printed copy of said e-mail message; and printing said signature information as another header page before printing said at least one attachment to said e-mail message and printing said at least one attachment after printing said another header page.

11. The method of claim 10, further comprising:

creating a file name for storage of said e-mail message from said signature information of said e-mail message;

storing said e-mail message to a storage location with said file name; and printing said signature information and said file name as a header page when said e-mail message is stored in said storage location.

12. The system of claim 8, wherein said signature information comprises a customized signature included within said e-mail.

13. The system of claim 8, wherein said signature information includes an origin of said e-mail, a recipient of said e-mail, and a date and time of said e-mail.

14. The system of claim 8, wherein said signature information and said file name are printed as a header page when said e-mail is stored.

15. The method of claim 10, wherein said signature information comprises a customized signature included within said e-mail message at an end of said e-mail message.

* * * * *